(12) United States Patent
Mitsuhashi

(10) Patent No.: US 9,826,475 B1
(45) Date of Patent: Nov. 21, 2017

(54) MOBILE TERMINAL DEVICE, NETWORK SYSTEM, AND NON-TRANSITORY COMPUTER READABLE STORAGE MEDIUM

(71) Applicant: FUJI XEROX CO., LTD., Tokyo (JP)

(72) Inventor: Hiroyuki Mitsuhashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/437,858

(22) Filed: Feb. 21, 2017

(30) Foreign Application Priority Data

Jul. 28, 2016 (JP) .................. 2016-148874

(51) Int. Cl.
| | |
|---|---|
| *H04W 60/04* | (2009.01) |
| *H04W 48/20* | (2009.01) |
| *H04W 48/14* | (2009.01) |
| *H04M 1/725* | (2006.01) |
| *H04N 1/32* | (2006.01) |
| *H04W 88/06* | (2009.01) |

(52) U.S. Cl.
CPC ....... *H04W 48/20* (2013.01); *H04M 1/72527* (2013.01); *H04N 1/32518* (2013.01); *H04N 1/32534* (2013.01); *H04W 48/14* (2013.01); *H04N 2201/0039* (2013.01); *H04N 2201/0055* (2013.01); *H04N 2201/0094* (2013.01); *H04N 2201/3208* (2013.01); *H04N 2201/3214* (2013.01); *H04N 2201/3215* (2013.01); *H04W 88/06* (2013.01)

(58) Field of Classification Search
CPC ......... G08B 25/016; B62H 5/20; H04L 67/26; H04L 63/10; H04L 63/0823; G06F 3/1207; G06F 17/30964; H04N 1/32507; H04W 4/02; H04W 4/22; H04W 4/008; H04W 40/22; H04W 24/08; H04W 76/023; H04W 88/04; H04W 48/16

USPC ..... 455/410, 435.2, 418; 358/1.14; 370/331, 370/230; 709/224; 380/250
See application file for complete search history.

(56) References Cited

U.S. PATENT DOCUMENTS

| | | | |
|---|---|---|---|
| 2006/0153138 A1 | 7/2006 | Asoh et al. | |
| 2013/0040603 A1* | 2/2013 | Stahlberg | H04L 63/126 455/410 |
| 2015/0355875 A1* | 12/2015 | Matsushita | G06F 3/1236 358/1.15 |

FOREIGN PATENT DOCUMENTS

| | | |
|---|---|---|
| JP | 2006-173809 A | 6/2006 |
| JP | 2006-262371 A | 9/2006 |
| JP | 2008-060699 A | 3/2008 |

* cited by examiner

*Primary Examiner* — Phuoc H Doan
(74) *Attorney, Agent, or Firm* — Oliff PLC

(57) ABSTRACT

A mobile terminal device can be used in a network system including a first network and a second network. Plural access points are connected to the first network. A common identification name is set to the plural access points. An access point having a coverage area overlapping with a part of a coverage area of the first network is connected to the second network. The mobile terminal device includes a detector, an execution unit, an acquiring unit, a connection controller, and a setting unit. The detector detects connectable access points. The execution unit executes an application which uses a network device connected to the first or second network. The acquiring unit acquires, from a history information memory, history information including (i) device identification information unique to the network device used when the application is executed in past, and (ii) device identification information unique to an access point.

12 Claims, 4 Drawing Sheets

PRINTING HISTORY INFORMATION

| DATE/TIME | SSID | ROUTER | PRINTER | RECEIVING INTENSITY | DESIG-NATION | |
|---|---|---|---|---|---|---|
| 20160704 10:00 | COMID | AAA | RP1 | 80 | | ~61 |
| 20160705 10:00 | RD | CCC | PP1 | 88 | | ~62 |
| 20160706 10:00 | RD | CCC | PP2 | 75 | 1 | ~63 |
| 20160707 10:00 | COMID | AAA | RP1 | 68 | | |
| ⋮ | | | | | | |

FIG.6

DETECTION RESULT

| SSID | ROUTER | RECEIVING INTENSITY |
|------|--------|---------------------|
| COMID | BBB | 88 |
| RC | CCC | 80 |

FIG.7

DETECTION RESULT

| SSID | ROUTER | RECEIVING INTENSITY |
|------|--------|---------------------|
| COMID | AAA | 40 (LOW) |
| COMID | BBB | 88 (HIGH) |
| RD | CCC | 80 (HIGH) |

MOBILE TERMINAL DEVICE, NETWORK SYSTEM, AND NON-TRANSITORY COMPUTER READABLE STORAGE MEDIUM

CROSS-REFERENCE TO RELATED APPLICATIONS

This application is based on and claims priority under 35 USC 119 from Japanese Patent Application No. 2016-148874 filed Jul. 28, 2016.

BACKGROUND

Technical Field

The present invention relates to a mobile terminal device, a network system, and a non-transitory computer readable storage medium.

SUMMARY

According to an aspect of the invention, a mobile terminal device can be used in a network system including a first network and a second network. Plural access points are connected to the first network. A common identification name is set to the plural access points. An access point having a coverage area overlapping with a part of a coverage area of the first network is connected to the second network. The mobile terminal device includes a detector, an execution unit, an acquiring unit, a connection controller, and a setting unit. The detector detects connectable access points. The execution unit executes an application which uses a network device connected to the first or second network. The acquiring unit acquires, from a history information memory, history information including (i) device identification information unique to the network device which is used when the application is executed in past, and (ii) device identification information unique to an access point to which the mobile terminal device is connected when the network device is used. Upon a predetermined operation for the execution of the application, the connection controller selects an access point to be connected when the application is executed, from the access points detected by the detector according to a predetermined selection rule with reference to the history information, and performs control for a connection to the selected access point. The setting unit sets the network device associated with the access point selected by the connection controller with reference to the history information, as a network device for the application to use.

BRIEF DESCRIPTION OF THE DRAWINGS

Exemplary embodiments of the present invention will be described in detail based on the following figures, wherein:

FIG. 6 is a view illustrating an example of a detection result by a router detector in the exemplary embodiment; and FIG. 7 is a view illustrating another example of the detection result by the router detector in the exemplary embodiment.

DETAILED DESCRIPTION

Hereinafter, exemplary embodiments of the present invention will be described with reference to the accompanying drawings.

Figure 1:
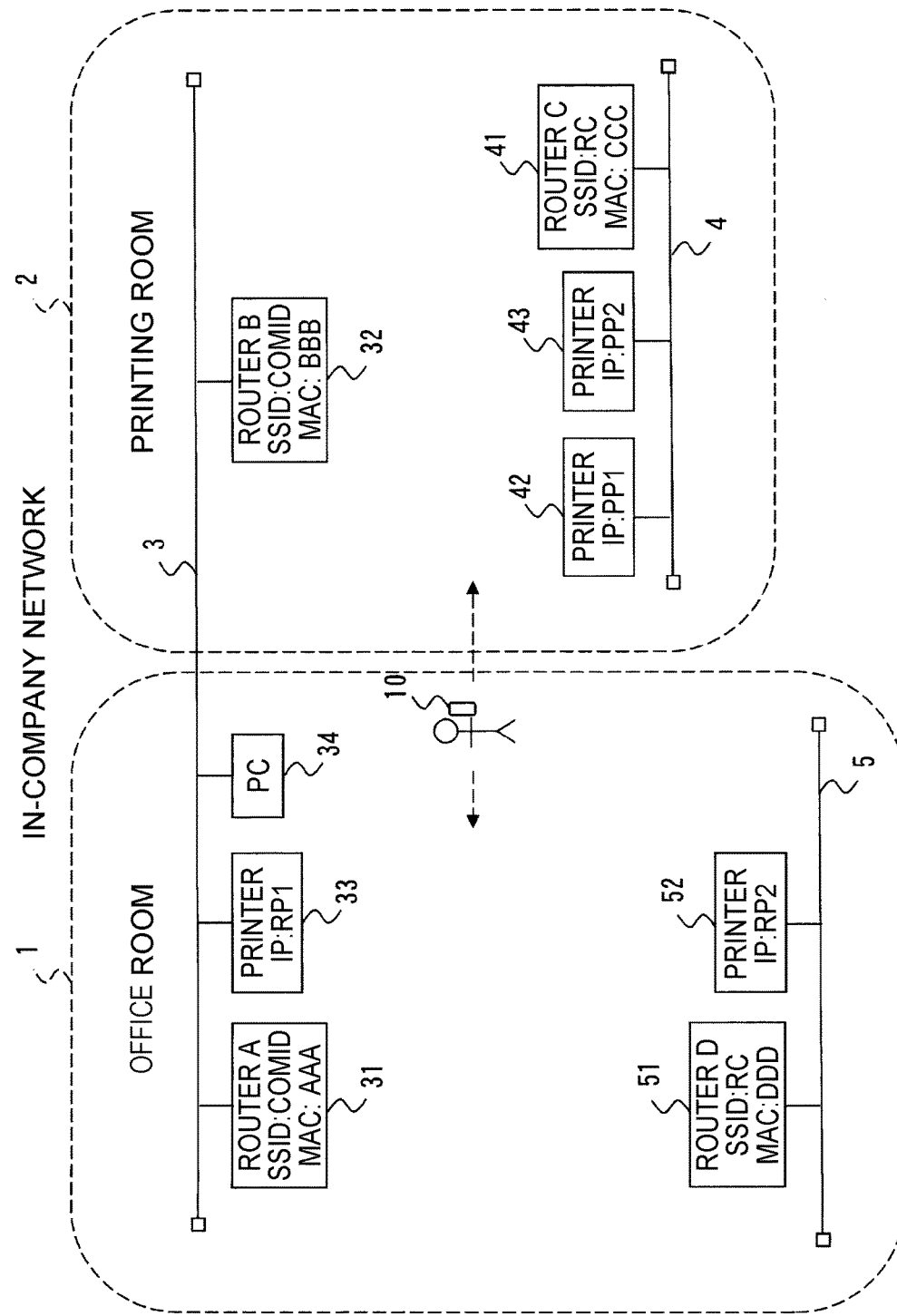
FIG. 1 is a view illustrating an entire configuration of a network system according to an exemplary embodiment of the present invention.

FIG. 1 is a view illustrating an entire configuration of a network system according to an exemplary embodiment of the present invention. FIG. 1 illustrates a network system (hereinafter, an "in-company network") built in a facility of a certain company. In the facility, there are an office room 1 where an employee (hereinafter, a "user") usually works, and a printing room 2 dedicated for performing a printing. Further, networks to be described below are installed in the facility.

A first network is a local area network (LAN) connecting plural routers 31 and 32 thereto and corresponds to a shared network 3 constructed by setting the same SSID for all the routers 31 and 32. A coverage area in the shared network 3 covers the entire area within the facility via the connected routers. In the present exemplary embodiment, a router, including the routers to be described below, is a wireless LAN router acting also as an access point by having a wireless access point function. The same SSID "COMID" is set for the router 31 of the MAC address "AAA" and the router 32 of the MAC address "BBB." In addition, in the present exemplary embodiment, unless otherwise specified, the router 31 makes the office room 1 a coverage area, and the router 32 makes the printing room 2 a coverage area. In addition, a printer 33 (IP address "RP1") installed within the office room 1 and a personal computer (PC) 34 used by a user are connected to the shared network 3.

A second network is a LAN built in the printing room 2 and corresponds to a dedicated network 4 making the printing room 2 a coverage area by a connected router 41 of a MAC address "CCC." Further, printers 42 and 43 having IP addresses "PP1" and "PP2," respectively, are connected to the dedicated network 4. As described above, since the shared network 3 makes the entire area within the facility a coverage area, the coverage area of the dedicated network 4 overlaps with the coverage area of the shared network 3 in the printing room 2 which is a part of the coverage area in the shared network 3.

A third network is a LAN built in the office room 1 and corresponds to a network 5 making the office room 1 a coverage area by a connected router 51 having a MAC address "DDD." Further, a printer 52 having an IP address "RP2" is connected to the network 5. A coverage area of the network 5 of the office room 1 overlaps with the coverage area of the shared network 3, inside the office room 1.

In the present exemplary embodiment, the printers 33, 42, 43, and 52 are network devices that are connectable to the LANs. The printers may be printers having a printing function or multifunction devices (image forming apparatuses) having, for example, a scanning function and a copying function.

In addition, FIG. 1 illustrates a mobile terminal device (hereinafter, simply a "mobile terminal") 10 carried by a user. In the present exemplary embodiment, descriptions will be made by assuming that the mobile terminal is a smartphone. However, the mobile terminal is not limited thereto, and may be a mobile terminal device such as a tablet terminal or a portable PC.

For a normal printing, the user selects and uses the printer 33 or 52 installed in the office room 1 by operating the PC 34 or the mobile terminal 10. However, when desiring to perform a special printing or a printing of a security document, the user moves to the printing room 2 to use the high-function printers 42 and 43.

FIG. 1 illustrates the configuration required for the description of the present exemplary embodiment, and the number of the machines connected to each of the LANs is not limited to that illustrated in FIG. 1.

Figure 2:
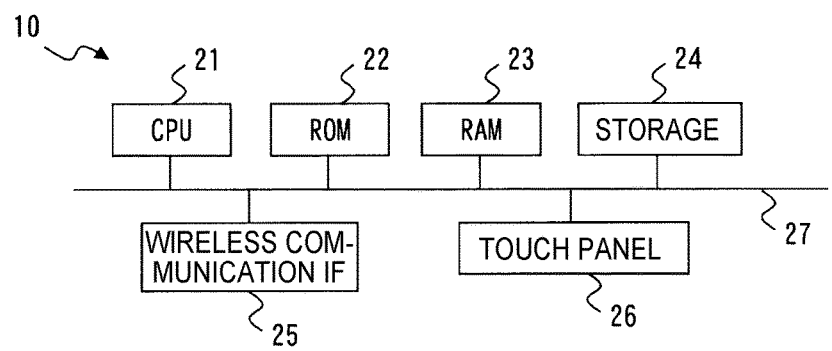
FIG. 2 is a view illustrating a hardware configuration of a mobile terminal in the exemplary embodiment.

FIG. 2 is a view illustrating a hardware configuration of the mobile terminal 10 in the present exemplary embodiment. In addition, FIG. 2 omits illustration of components that are not used for the descriptions of the present exemplary embodiment. In the present exemplary embodiment, the mobile terminal 10 may be implemented with a general-purpose hardware configuration of related art which is equipped with a computer therein. That is, as illustrated in FIG. 2, the mobile terminal 10 is configured such that a CPU 21, a ROM 22, a RAM 23, a storage 24, a wireless communication interface (IF) 25 wirelessly communicating with a router, and a touch panel 26 provided as a user interface unit are connected to an internal bus 27.

Figure 3:
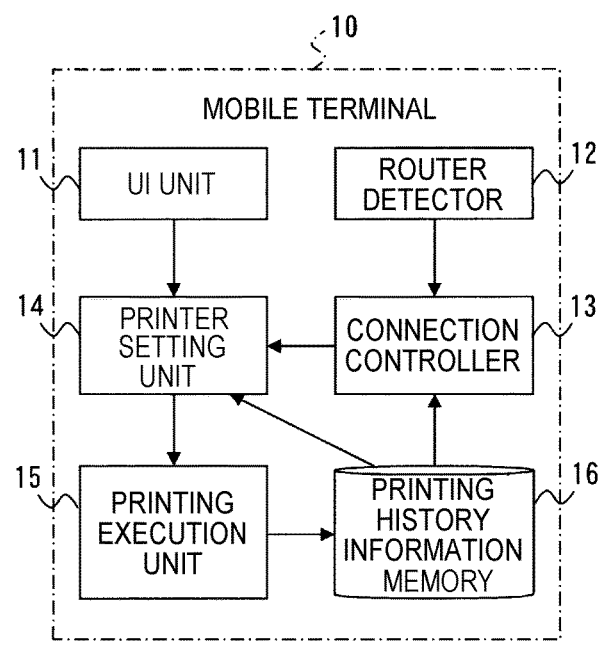
FIG. 3 is a block diagram illustrating a configuration of the mobile terminal in the exemplary embodiment.

FIG. 3 is a block diagram illustrating the configuration of the mobile terminal 10 in the present exemplary embodiment. In addition, FIG. 3 omits illustration of components that are not used for the descriptions of the present exemplary embodiment. In the present exemplary embodiment, the mobile terminal 10 includes a user interface (UI) unit 11, a router detector 12, a connection controller 13, a printer setting unit 14, a printing execution unit 15, and a printing history information memory 16. The user interface unit 11 causes, for example, the touch panel 26 to display information and receives information input from the touch panel 26. The router detector 12 is a detecting unit that detects a connectable router. The connection controller 13 is provided as a connection controller. Upon a predetermined operation for execution of a printing application by a user who moves from a place (the office room 1 in the present exemplary embodiment) in the coverage area of the shared network 3 and outside the coverage area of the dedicated network 4 to a place (the printing room 2 in the present exemplary embodiment) in the coverage areas of the shared network 3 and the dedicated network 4, when a router to which the mobile terminal 10 is connected before the movement is not detected by the router detector 12, the connection controller 13 selects a router to be connected when the printing application is executed from routers detected by the router detector 12 according to a predetermined selection rule with reference to history information, and performs control for a connection to the selected router. The printer setting unit 14 is provided as a setting unit, and sets a printer associated with the router selected by the connection controller 13 as a printer to be used for the printing application with reference to history information accumulated in the printing history information memory 16. The printing execution unit 15 executes the printing application using the printers 33, 42, 43, and 52 being connected to any of LANs 3, 4, and 5.

Figures 4, 5:
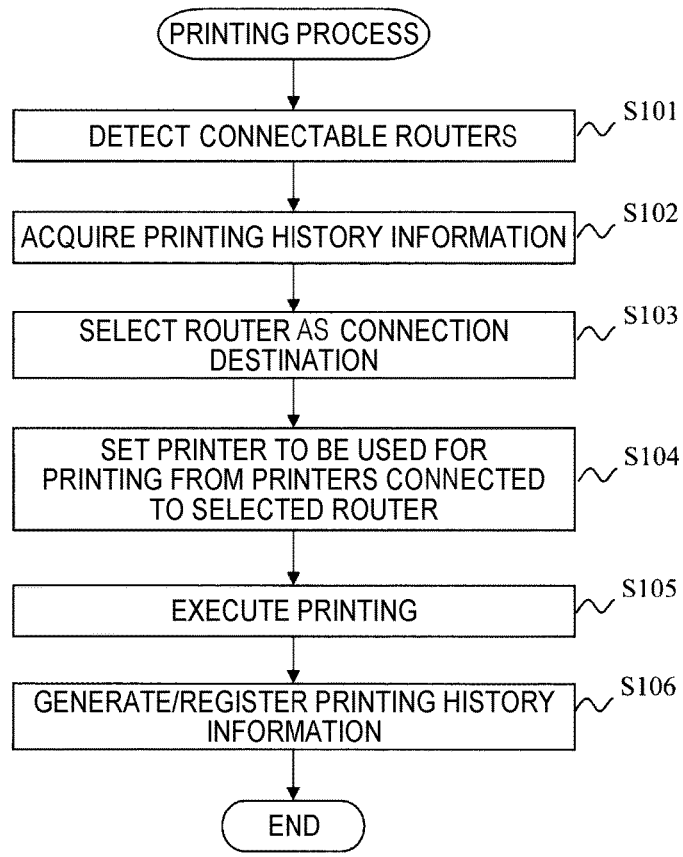
FIG. 4 is a view illustrating an exemplary data structure of printing history information accumulated in a printing history information memory in the exemplary embodiment.
FIG. 5 is a flow chart illustrating a basic printing process in the exemplary embodiment.

FIG. 4 is a view illustrating an exemplary data structure of the printing history information accumulated in the printing history information memory 16 in the present exemplary embodiment. The printing history information includes "Date and Time" indicating a date and time when a printing is performed, "SSID" of a router to which the mobile terminal 10 is connected at the time that the print is performed, "Router" in which a MAC address of the router is set, "Printer" in which an IP address of a printer used for the printing is set, "Receiving Intensity" indicating a radio field intensity received from the router to which the mobile terminal 10 is connected at the time the printing is performed, and "Designation" as flag information indicating whether the printer is a printer designated by a user (whether the printer is designated in order to change an initially set printer or a previously used printer). In the "Designation," "1" is set when a printer is specifically designated by a user. In addition, although the SSID is not used in the present exemplary embodiment, FIG. 4 illustrates the SSID for convenience of the descriptions.

In the mobile terminal 10, each of the components 11 to 15 is implemented by a cooperative operation between the computer equipped in the mobile terminal 10 and a program acting as the CPU 21 equipped in the computer. In addition, the printing history information memory 16 is implemented with the storage 24 equipped in the mobile terminal 10. Alternatively, the RAM 23 or an external memory may be used for a network route.

Programs used in the present exemplary embodiment may be provided by a communication unit or may be provided in a state of being stored in a computer readable recording medium such as a CD-ROM or a USB memory as well. The programs provided from the communication unit or the recording medium are installed in a computer, and a CPU of the computer sequentially execute the programs so as to implement various processes.

Next, descriptions will be made on a flow of a basic process until a user performs a printing, in the present exemplary embodiment by using the flow chart illustrated in FIG. 5. Here, as an initial state, it is assumed that the user is present in the office room 1, and the mobile terminal 10 is in a state of being wirelessly connected to the router 31. At this time, it is assumed that, although the printer 33 is in a usable state, the user moves to the printing room 2 while carrying the mobile terminal 10 in order to use the printers installed in the printing room 2.

When the user moves to the printing room 2, the mobile terminal 10 may not receive the radio waves emitted from the router 31. According to related art, in this case, the connection destination is automatically switched to the router 32 having the same set SSID "COMID" such that the mobile terminal 10 is continuously connected to the same shared network 3. Thus, the user needs to manually switch the wireless connection destination of the mobile terminal 10 to the router 41 of the dedicated network 4, and designate the printer 42 or 43 that the user desires to use. Accordingly, in the present exemplary embodiment, the mobile terminal 10 is operated as follows.

That is, when the user moves to the printing room 2 and starts the printing application for execution of the printing by operating the touch panel 26, the router detector 12 detects routers that are connectable at the current time (step 101). Here, as illustrated in FIG. 6, it is assumed that the router detector 12 detects the router 32 having the SSID "COMID" and the MAC address "BBB" and the router 41 having the SSID "RC" and the MAC address "CCC", and that the router detector 12 does not detect the router to which the mobile terminal 10 is connected before the movement, i.e., the router 31 having the SSID "COMID" and the MAC address "AAA". Meanwhile, the connection controller 13 reads and acquires the printing history information accumulated in the printing history information memory 16 (step 102). In this way, the mobile terminal 10 detects the router(s)

and acquires the printing history information, in response to the start of the printing application. In the flow chart, the detection of the routers is first performed. However, the performing sequence may be reversed, or the detection of the routers and the acquisition of the printing history information may be performed at the same time.

Subsequently, the connection controller 13 checks whether the detected routers 32 and 41 have been registered in the printing history information, and selects a registered router as the connection destination of the mobile terminal 10. According to the setting of the printing history information illustrated in FIG. 4, the router 32 having the MAC address "BBB" is not registered. This is because, although the user may perform the printing from the printer 33 by connecting the mobile terminal 10 to the router 32, using the printer 33 installed in the office room 1 apart from the printing room 2 is not practical. Accordingly, the connection controller 13 selects the router 41 as the connection destination of the mobile terminal 10, from the routers 32 and detected by the router detector 12, according to a predetermined selection rule such that a router has been, and controls the wireless communication interface 25 to be connected to the router 41 (step 103).

Subsequently, when the connection destination is selected, the printer setting unit 14 sets a printer to be used for the printing from the printers 42 and 43 connected to the router 41 (step 104).

From the printing history information illustrated in FIG. 4, it is found that both the printers 42 and 43 connected to the router 41 have been used for printing. Here, for simplification of the descriptions, assuming that a record 63 does not exist, that is, the printer 43 has not been used, the printer setting unit 14 sets the printer 42 connected to the router 41 as the printing destination with reference to a record 62.

When the printer 42 is set to be used for the printing as described above, the printing execution unit 15 transmits document data designated by the user to the printer 42 to cause the printer 42 to execute the printing (step 105). Then, after the execution of the printing, the printing execution unit 15 generates printing history information by associating the date and time of the printing, the IP address of the printer 42 used for the printing, the SSID and the MAC address of the router 41 used for the connection to the dedicated network 4, and the receiving intensity from the router 41 with each other, and registers the printing history information in the printing history information memory 16 (step 106).

In addition, since the printer and the router to be used for the printing are specified at the time that a printer is designated by the user, the printing history information may be generated and registered at the time that the printer is set, without waiting for the execution of the print.

Descriptions have been made on the flow of the basic process which is performed upon executing a printing, in the present exemplary embodiment. As described above, in the present exemplary embodiment, in the case where the user moves to the printing room 2, when the MAC addresses of the routers 31 and 32 are compared and the addresses are recognized to be different from each other even though the router 32 having the same set SSID as that of the router 31 to which the mobile terminal 10 is connected before the movement exists, the simple switching to the router 32 is not performed but a new connection destination is selected for switching with reference to the printing history information. Accordingly, in the present exemplary embodiment, the SSID is not used as a reference for selecting a connection destination.

Of the routers 32 and 41 detected in step 101 of the basic process, the router 32 has not been used for printing. Thus, it is easy to select the router 41 in step 103. However, in actuality, the connection controller 13 may extract plural routers as selection candidates if the plural routers have been used for printing.

For example, the mobile terminal 10 may still receive the radio waves from the router 31 even when the user moves to the printing room 2. FIG. 7 illustrates a result of detecting a router in this case. As can be seen in the detection result illustrated in FIG. 7, even though the mobile terminal 10 is in a state of being able to wirelessly communicate with the router 31, the receiving intensity becomes weak because the mobile terminal 10 stays away from the router 31. Accordingly, the connection controller 13 may select the router 41 as the connection destination of the mobile terminal 10, out of the routers 31, 32, and 41 detected by the router detector 12, according to a predetermined selection rule such that a router has the receiving intensity equal to or larger than a predetermined value ("high" (e.g., 75) receiving intensity). In addition, as described above, although the receiving intensity thereof is higher than that of the router 41, the router 32 is not selected because the router 32 has not been used for printing. In addition, when plural routers having the receiving intensity equal to or larger than the predetermined value exist, a router having the highest receiving intensity may be selected.

In addition, instead of referring to the receiving intensity, for example, with reference to information of time (the "Date and Time" in FIG. 4) when printers connected to the same LAN are used for a printing, for example, the lately used router may be selected from the selection candidates.

In addition, the number of times a router is used may be obtained by adding up the printing history information registered in the printing history information for each router, and for example, a router used the most may be selected from selection candidates.

As described above, when there are plural routers which have been used for printing in the past and which are detected by the router detector 12, one router may be selected from the selection candidates with reference to, for example, the receiving intensity, the time information, and the number of times each router is used. The selection rule may appropriately combine the receiving intensity, the time information, and the number of times each router is used with each other, rather than using each of the receiving intensity, the time information, and the number of use times individually. In the case of the combination, the priority or importance may be appropriately set.

In the above-described basic process, for simplification of the descriptions, it is assumed that of the printers 42 and 43 connected to the dedicated network 4, only the printer 42 has been used for printing. However, when the record 63 is registered, that is, the printer 43 also has been used for printing, which leads to plural selection candidates, the printer setting unit 14 selects and sets a printer according to the following predetermined selection rule.

First, with reference to the flag information "Designation" of the printing history information indicating a printer manually selected by the user, the printer 43 for which the flag is set may be selected. This is because the user directly selects the printer, and thus, the printer is highly likely to be used by the user later.

Instead of referring to the designation by the user, for example, with reference to information of time (the "Date and Time" in FIG. 4) when printers connected to the same LAN are used for a printing, for example, the lately used printer 43 may be selected from the printers 42 and 43 of the selection candidates.

In addition, the number of times each of the printers 42 and 43 is used may be obtained by integrating the printing history information registered in the printing history information for each of the printers, and for example, a printer used the most may be selected.

In addition, it may be checked whether each of the printers 42 and 43 is in the usable state, and a printer to be used for a printing may be set from the usable printers 42 and 43. Whether the printers are in the usable state may be checked by using, for example, ping.

In addition, a printer may be selected with reference to a positional relationship between each of the printers 42 and 43 and the mobile terminal 10. More specifically, position information (longitude and latitude information) of each of the printers 33, 42, 43, and 52 is acquired in advance, and a printer closest to the mobile terminal 10 is set with reference to the relationship between the positions of the printers 42 and 43 as selection candidates and the position of the mobile terminal 10. As a unit that acquires the position information, for example, GPS, Wi-Fi locating, or entering/leaving management information may be used. Alternatively, the mobile terminal 10 may acquire a distance measured when a printer sends a beacon, and a printer may be set based on the measured relative distance. As a unit that acquires the relative distance, for example, Bluetooth or Wi-Fi may be used.

In addition, capability information such as specification and performance of a printer may be acquired in advance, and a printer may be selected from selection candidates with reference to the capability information. For example, the highest performance printer may be selected.

In the present exemplary embodiment, as described above, a router is appropriately switched and a printer is automatically set, according to the movement of the user. The result of the automatic process, that is, a router as a new connection destination and a printer to be used may be displayed as a pop-up on the touch panel 26, or a confirmation dialogue may be displayed. When the user refuses to use the router and the printer to be newly used, the user may cancel the setting and returns the setting back to the previous setting.

In addition, in the present exemplary embodiment, descriptions have been made on the example where the network device is a printer. When the network device is a multifunction device also providing other functions (e.g., scanning) in addition to the printing, the history information may be separately managed for each function, and the user may refer to the history information corresponding to an application started by the user.

In addition, in the present exemplary embodiment, the second network is the dedicated network 4 of the printing room 2. However, the second network may not be a dedicated network as long as the second network is a LAN constructed separately from the shared network 3. That is, the second network may be a shared network different from the shared network 3.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A mobile terminal device that can be used in a network system including (i) a first network to which a plurality of access points are connected, a common identification name being set to the plurality of access points, and (ii) a second network to which an access point having a coverage area overlapping with a part of a coverage area of the first network is connected, the mobile terminal device comprising:
   a detector that detects connectable access points;
   an execution unit that executes an application which uses a network device connected to the first or second network;
   an acquiring unit that acquires, from a history information memory, history information including
      device identification information unique to the network device which is used when the application is executed in past, and
      device identification information unique to an access point to which the mobile terminal device is connected when the network device is used;
   a connection controller, wherein upon a predetermined operation for the execution of the application, the connection controller selects an access point to be connected when the application is executed, from the access points detected by the detector according to a predetermined selection rule with reference to the history information, and performs control for a connection to the selected access point; and
   a setting unit that sets the network device associated with the access point selected by the connection controller with reference to the history information, as a network device for the application to use.

2. The mobile terminal device according to claim 1, wherein upon the predetermined operation for the execution of the application by a user who moves from a place which is in the coverage area of the first network and outside a coverage area of the second network to a place which is in the coverage areas of the first and second networks, when an access point which is connected before the movement is not detected by the detector, the connection controller selects the access point to be connected when the application is executed, from the access points detected by the detector according to the predetermined selection rule with reference to the history information, and performs the control for the connection to the selected access point.

3. The mobile terminal device according to claim 2, wherein the connection controller selects the access point to be connected with reference to a radio field intensity received from each of the access points detected by the detector.

4. The mobile terminal device according to claim 2, wherein
   the history information is further associated with information of time when the network device is used, and
   the connection controller selects the access point to be connected, with reference to the information of time.

5. The mobile terminal device according to claim 2, wherein
   the connection controller adds up the history information acquired by the acquiring unit for each access point included in the history information to obtain the number of time each access point is used, and the connection controller selects the access point to be connected with reference to the number of times each access point is used.

6. The mobile terminal device according to claim 2, wherein the history information further includes information indicating whether the network device is selected through a selection operation by a user, and when a plurality of network devices are associated with the access point selected by the connection controller, the setting unit sets the network device selected by the user in the past as the network device for the application to use.

7. The mobile terminal device according to claim 2, wherein the history information further includes information of time when the network device is used, and when a plurality of network devices are associated with the access point selected by the connection controller, the setting unit selects and sets a lately used network device as the network device for the application to use with reference to the history information.

8. The mobile terminal device according to claim 2, wherein when a plurality of network devices are associated with the access point selected by the connection controller, the setting unit adds up the history information acquired by the acquiring unit for each access point included in the history information to obtain the number of time each access point is used, and sets the access point for the application to use with reference to the number of times each access point is used.

9. The mobile terminal device according to claim 2, wherein when a plurality of network devices are associated with the access point selected by the connection controller, the setting unit checks whether each of the network devices is in a usable state, and sets the network device for the application to use from the usable network devices.

10. The mobile terminal device according to claim 2, wherein when a plurality of network devices are associated with the access point selected by the connection controller, the setting unit sets the network device for the application to use with reference to a positional relationship between each of the network devices and the mobile terminal device.

11. A network system comprising:
a first network to which a plurality of access points are connected, a common identification name being set to the plurality of access points;
a second network to which an access point having a coverage area overlapping with a part of a coverage area of the first network is connected;
a mobile terminal device; and
a history information memory that stores history information including
device identification information unique to a network device which is used when an application is executed in past, and
device identification information unique to an access point to which the mobile terminal device is connected when the network device is used,
in association with each other,
the mobile terminal device including
a detector that detects connectable access points,
an execution unit that executes the application which uses a network device connected to the first or second network,
a connection controller, wherein upon a predetermined operation for the execution of the application, the connection controller selects an access point to be connected when the application is executed, from the access points detected by the detector according to a predetermined selection rule with reference to the history information, and performs control for a connection to the selected access point, and
a setting unit that sets the network device associated with the access point selected by the connection controller with reference to the history information, as a network device for the application to use.

12. A non-transitory computer readable storage medium storing a program causing a computer to function as the following units, the computer mounted in a mobile terminal device used in a network system including (i) a first network to which a plurality of access points are connected, a common identification name being set to the plurality of access points, and (ii) a second network to which an access point having a coverage area overlapping with a part of a coverage area of the first network is connected, the units comprising:
a detector that detects connectable access points;
an execution unit that executes an application which uses a network device connected to the first or second network;
an acquiring unit that acquires, from a history information memory, history information including
device identification information unique to the network device which is used when the application is executed in past, and
device identification information unique to an access point to which the mobile terminal device is connected when the network device is used;
a connection controller, wherein upon a predetermined operation for the execution of the application, the connection controller selects an access point to be connected when the application is executed, from the access points detected by the detector according to a predetermined selection rule with reference to the history information, and performs control for a connection to the selected access point; and
a setting unit that sets the network device associated with the access point selected by the connection controller with reference to the history information, as a network device for the application to use.

* * * * *